Feb. 22, 1949.   L. G. DUGGAR   2,462,077
NAVIGATIONAL SYSTEM
Filed March 19, 1946   2 Sheets-Sheet 1
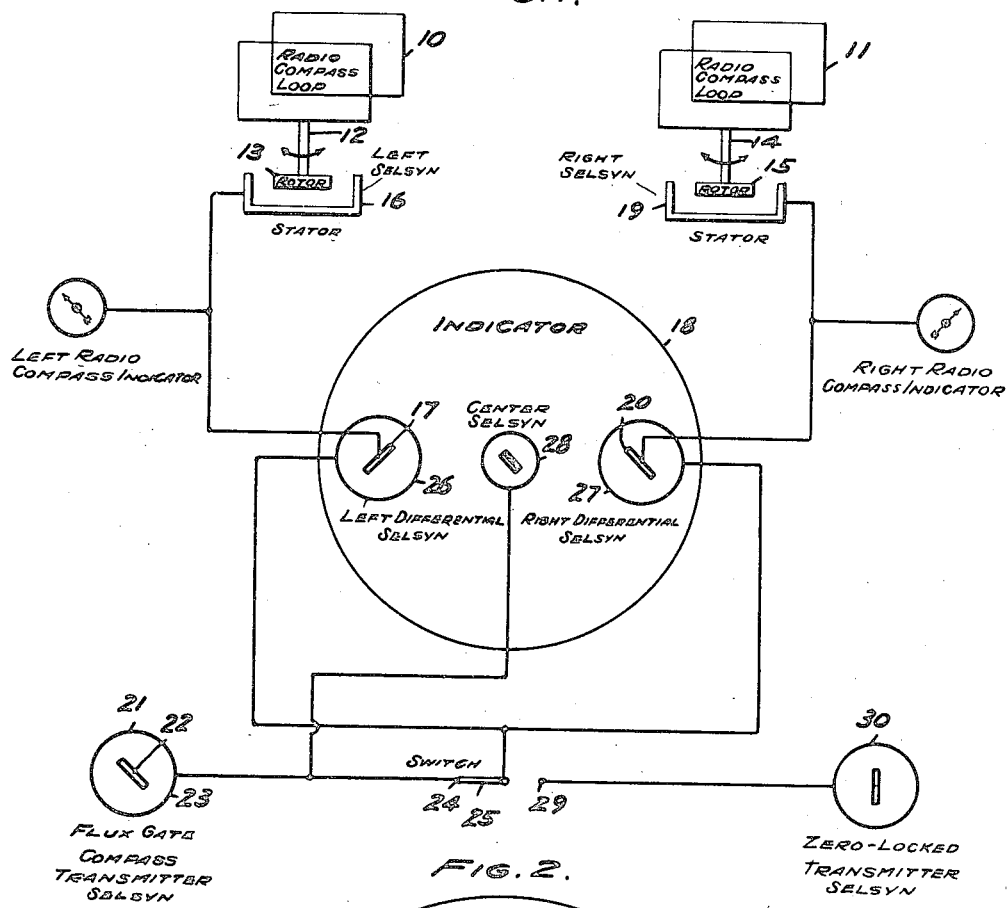
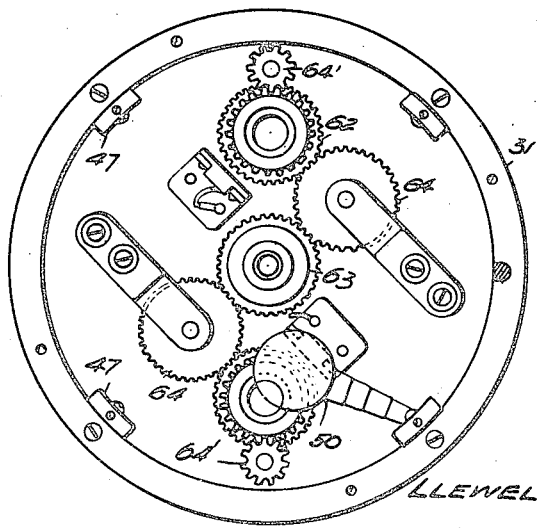
INVENTOR
LLEWELLYN G. DUGGAR
BY William D. Hall
ATTORNEY Feb. 22, 1949.                L. G. DUGGAR                2,462,077
                            NAVIGATIONAL SYSTEM
Filed March 19, 1946                              2 Sheets-Sheet 2
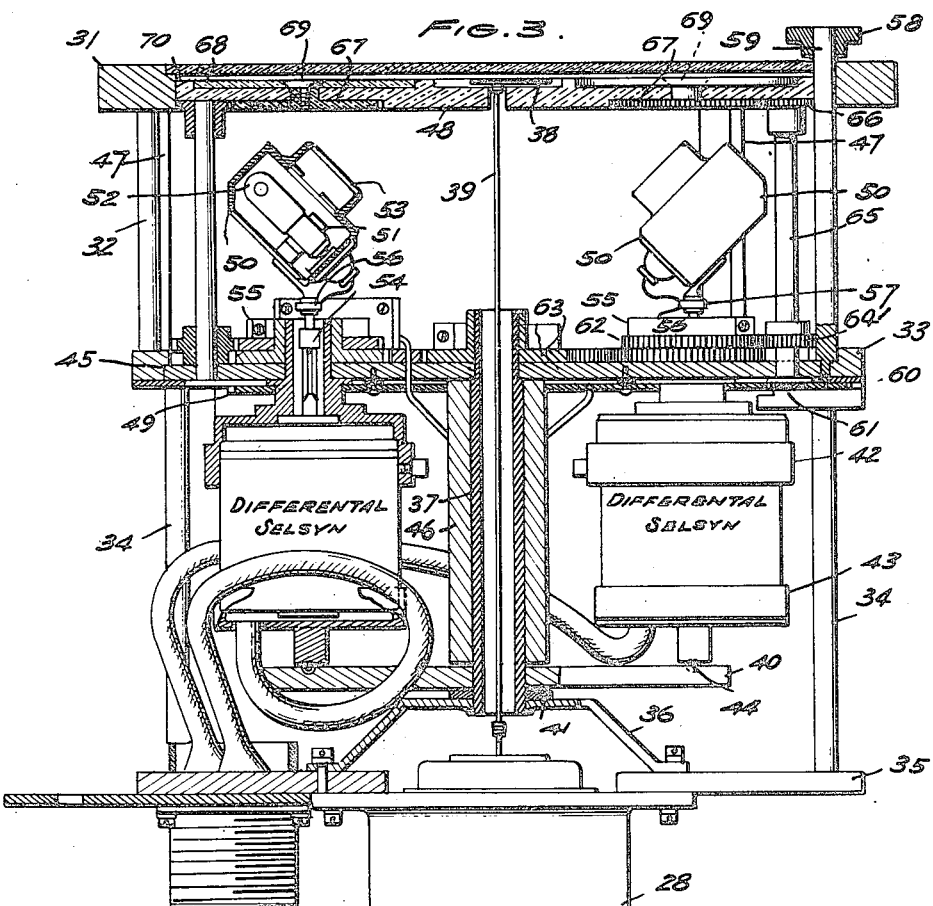
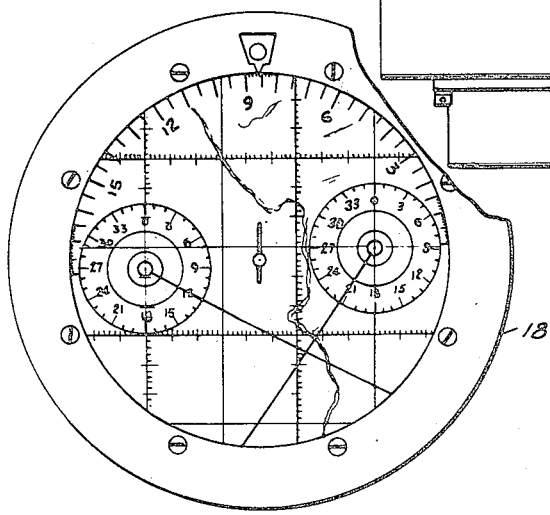
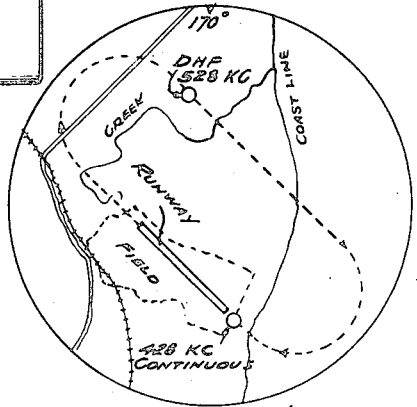

Patented Feb. 22, 1949

2,462,077

UNITED STATES PATENT OFFICE 2,462,077

NAVIGATIONAL SYSTEM

Llewellyn G. Duggar, Montgomery, Ala.

Application March 19, 1946, Serial No. 655,540

11 Claims. (Cl. 343—112)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to navigational systems and more particularly to a navigational device in which there is provided a continuous visual indication of the position of a vehicle with respect to the known locations of two radio stations and with respect to the true north.

Heretofore, prior devices of this general type have been large, bulky, and complicated in both arrangement and operation, with the result that they have not gained acceptance in the field.

It is one object of my invention to provide a navigational instrument intended primarily for use by the pilot of a vehicle or craft.

Another object of the present invention lies in the provision of a novel automatic position indicating system, whereby there is automatically and continuously provided the geographical position of the vehicle with respect to two radio stations and also the vehicle heading, thus providing at a single glance all the necessary horizontal-plane information required for navigation of the vehicle.

It is another object of my invention to provide a visual navigational device which will continuously and automatically indicate the fix of the vehicle by combining the information received from two or more radio compasses and a flux gate compass, the information being combined in such manner as to take into account the orientation of the vehicle with respect to true north.

These and other objects and advantages will become readily apparent from the specification, taken in connection with the accompanying drawings in which:

Fig. 1 is a diagrammatic layout of my invention;

Fig. 2 is a front view of the visual indicator portion of my invention;

Fig. 3 is a vertical cross-sectional view of the indicating instrument illustrated in Fig. 2;

Fig. 4 is a front view of the indicator; and

Fig. 5 is a diagram of an instrument landing pattern utilizing the invention.

While the following description describes my invention as utilized in an aircraft, the term vehicle is intended to include land, sea, undersea and airborne vehicles.

Referring to Fig. 1, which illustrates a diagrammatic layout of my invention, it is seen that the reference numerals 10 and 11 refer to radio direction finder loop antennas of the type which are normally automatically oriented to the desired radio transmitters, but which may be hand rotated to various positions of azimuth if so desired. The loop antennas 10 and 11 are each utilized with a radio receiver or receivers (not shown) whereby a bearing may be taken on one or more radio transmitters in a manner well known in the art. Since the radio receiver portion of the radio direction finder forms no part of my invention, no description is given of the receiver per se. A pair of self synchronous generators or transmitters of the type well known in the art by the trade name Selsyn, each having a rotor and a stator, are so positioned with respect to each rotating loop antenna 10 and 11 that the loop antenna 10 is connected by a drive 12 with the rotor 13 of the left transmitting Selsyn, and the loop antenna 11 is connected by means of a drive 14 to the rotor 15 of the right transmitting Selsyn. Thus the rotation of the loop antenna 10 will cause the left generator Selsyn rotor 13 to assume the identical angular position for azimuth. In a similar manner the right Selsyn rotor 15 will have the same angular position of azimuth as the loop antenna 11. It is understood that the drives 12 and 14 may be direct mechanical drives or any other suitable means for transferring the rotational movement of the loop antennas to the rotor of each of the respective left and right transmitting Selsyns.

The stator 16 of the left Selsyn is connected to a rotor 17 of a differential self synchronous receiver of the type well known in the art as a differential Selsyn, located in the left hand portion of an indicating instrument 18. In like manner the stator 19 of the right Selsyn is connected to a rotor 20 of a differential Selsyn located in the right hand portion of the indicator 18.

The flux-gate compass or similar instrument for true north direction indication utilized in my system is a device that is well known in the art and since it forms no part of my invention, no description of the flux-gate compass per se is given.

The flux gate compass reading or indication is transmitted by suitable means to a flux gate compass Selsyn 21 so that the rotor 22 of the flux gate compass Selsyn 21 assumes the same azimuth position as the flux gate compass indicator. The stator winding 23 of the flux gate compass Selsyn 21 is connected to one contact 24 of a single-pole double-throw switch 25. The blade of the switch 25 is connected to the stator 26 of the left differential Selsyn and also to the stator 27 of the right differential Selsyn. The stator of a center Selsyn 28 is connected directly to the stator 23 of the flulx gate compass Selsyn 21 so that the center Selsyn of the indicator 18 repeats the indication of the flux gate compass carried by the vehicle. The other contact 29 of the switch 25 is connected to the stator of a zero-locked Selsyn 30, the purpose of which will be fully described later.

The differential Selsyns utilized in the indicator 18 are a well known type having a three-phase rotor within a three-phase stator. Their use enables the resting position of the rotor to be determined by two separate transmitting Selsyns instead of a single transmitting Selsyn. The differential Selsyns are such that they indicate the algebraic sum of the two angles through which the transmitting Selsyn rotors move.

The zero-locked Selsyn 30 is a standard type of transmitter Selsyn with its shaft locked in a position representing the zero position of the radio compass indicators.

As stated previously, the information obtained from the two radio compasses and the flux gate compass is combined and displayed in an indicating device 18. The indicator is sufficiently small and light to be mounted on or near the vehicle instrument panel.

The radio compasses provide continuous bearings from each of the two ground radio stations to the air craft, and the flux gate compass provides two functions, first to provide a repeater indication of air craft heading on indicator 18 by means of center Selsyn 28, and secondly to convert the radio compass bearings from relative azimuths to true north azimuths, the latter function being termed "azimuth stabilization." The indicator 18 is so constructed that it may be adjusted to put the locations of the two radio stations in their true azimuth position. The information shown on the face of the indicator 18 is in the form of two intersecting light beams, the origin of each beam representing the position of the radio transmitter, and the point of intersection of the two light beams representing the vehicle fix. The radio stations and the vehicle fix form a true triangulation picture, as if viewed on a map with true north at the top.

As seen from Fig. 3 which is a vertical cross-sectional view of the indicator 18 shown in Fig. 1, the indicator itself is contained in a housing made up of a front bezel plate 31, spacer posts 32, ring 33, spacer posts 34 and a rear plate 35. A shaft 37 for a rotatable assembly is supported by a bracket 36 which is welded or otherwise securely fastened to the shaft 37 at its base. The center motor Selsyn 28 is mounted on the rear plate 35, transmitting its indication to a pointer 38 by means of an extension shaft 39. The pointer 38 revolves in a counter sink in the front of the face plate of the indicator. The base of the rotatable assembly is a radial arm 40 supported by a washer 41. The left and right differential Selsyns are mounted in brackets 42 and 43, the rear bracket 43 being pivoted on a bearing 44 resting in a depression in the radial arm 40. A plate 45 rests on a bushing 46 and in turn supports a plurality of posts 47 which in turn support a face plate 48, the face plate being made of a transparent material such as glass or a plastic material such as Plexiglas. A gear plate 49 is mounted on the plate 45. A lamp box 50, containing a bulb holder 51, a bulb 52, and a slotted aperture box 53 are mounted on the shaft of each differential Selsyn by means of a clamp 54. A brush holder 55 supports the brushes 56 which make contact to the bulb 52 through a slip ring 57.

The entire rotatable assembly can be turned through 180° by means of a knob 58 mounted on a shaft 59 which rotates a gear 60. Rotation of the gear 60 will cause the gear plate 49 to be rotated through an idler gear 61. Rotation of the plate 45 turns a set of double gears 62 from the drive furnished by a fixed gear 63 through a set of idler gears 64 mounted on the plate 45. Rotation of the double gears 62 with respect to the plate 40 is transmitted to gear 64 and through shaft 65 to the gear 66 which in turn drive a set of gears 67. The gears 67 are rigidly mounted to transparent compass rose cards 68 by means of fasteners 69. The gearing system just described enables the differential Selsyns and the compass rose cards to remain fixed in a position with respect to the true north or azimuth setting at the top of the instrument when the entire rotatable assembly is turned. Stops may be provided to prevent the rotatable assembly from turning more than 5° past the zero or 180° marks. A circular cover plate 70 made of glass or some plastic material such as Plexiglas is fitted in the front bezel plate 31. The light beams from the lamp boxes 13 are directed on to the under side of the translucent plate 70. The radio compass rose cards 68 and the gearing 67, as well as the face plate 48 are made of a translucent material such as Plexiglas so that the light beams from the lamps 52 may pass through them and be visible on the face plate 48 to the operator. Diametrically opposite on the face plate 70 and directly above the Selsyn shafts are the two translucent compass rose cards 68, the distance between the centers of which always represents the base line between the two radio transmitting stations from which radio compass bearings are taken. The rose cards 68 are provided with suitable calibration marks at 5° intervals and may be provided with luminous marks and figures at 10° intervals.

Half of the outer rim of the face plate 48 is calibrated at intervals from zero to 180° with luminous marks at 5° intervals and figures at 30° intervals. The zero and 180° marks are diametrically in line with the centers of the compass rose cards 68, the numbers progressing counterclockwise so as to increase as the face is rotated clockwise. A luminous index pointer at the top of the face indicates the true azimuth angle between the left and right compass rose centers, which can be varied from zero to 180° by means of the knob 58. As the true azimuth angle is varied, the zero mark on the compass roses stays at the top.

The indicator face may be protected from ambient light by providing a hood which can be moved forward if needed and rearward if there is no need for shielding the face of the indicator 18.

Referring again to the diagrammatic showing in Fig. 1, when the switch 25 is thrown to the contact 29 the stators 16 and 19 of the left and right compass Selsyns are connected to the stator of the zero-locked transmitter Selsyn 30 which has its shaft and rotor locked in the zero position. The positions of the right and left differential Selsyn rotors is then determined solely by the signal transmitted from the left and right compass loop Selsyns respectively. The two compass roses on the indicator 18 then serve as radio compass indicators in which the reading is furnished by a light beam instead of by a needle as in a regular radio compass instrument. Therefore, by throwing the switch 25 to the contact 29 the indicator 18 operates as a radio compass indicator solely. With the switch 25 positioned to contact 24 the indicator 18 operates in the manner previously described in which the indications of the radio compass are modified or "stabilized" by the indications of the flux gate compass so that the information shown by the indicator 18 gives the true azimuth position of the vehicle at all times.

The two radio stations chosen to obtain a fix may be located from a few thousand feet to several hundred miles apart. On the face of the indicator 18, this distance between stations is represented by a fixed length and with the distance between the radio stations known, the scale of miles of the triangulation picture on the face of the indicator 18 is easily derived. The wide permissible range of this distance between radio stations adapts my invention for either long range navigation or close range work, including instrument landings.

Referring to Fig. 4 which shows the face of the indicator instrument 18 as it appears when giving a fix, it is seen that the true azimuth between the two radio stations utilized to obtain a fix is 86°, to which index mark the face of the indicator has been rotated by means of the knob 68. Information shown on the face of the indicator is that the aircraft has a true azimuth bearing of 212° from one of the radio stations and 115° from the other, the heading of the vehicle being approximately 355°, the intersection of the two light beams giving the fix of the vehicle.

If range information is desired, it may be obtained by setting up a scale of miles or feet on the instrument face from the known distance between the two radio stations, which is always equal to the distance between the centers of the compass rose card. In the instrument indicator illustrated in Fig. 4 the distance between centers of the compass rose cards is equal to three inches.

Whenever possible the ground radio stations to be chosen for a fix should be those which will as nearly as possible give an intersection on the face of the indicator that will form a right angle between the two light beams. Quality of the fix deteriorates as the angle of intersection of the light beams approaches zero or 180°. Fixes that fall off the face of the indicator 18 may be approximated and may be advantageously set up when the fix will move toward the center of the face of the indicator. A maximum cumulative error of 4° may be present in each bearing indication, representing the total of allowable error in the flux gate and radio compass systems, 2° in each.

As seen in Fig. 4, a transparent map showing the terrain of the area to be covered by the vehicle may be placed so that the intersection of the two light beams will give the operator thereof the geographical location of the vehicle with true north azimuth relationship. If no map is available or the operator wishes to plot his course, all pertinent information may be written on the transparent cover plate by means of a wax pencil, which writing may be easily removed so that other information may be placed on the transparent cover if desired.

In the operation of the device for obtaining a fix the operator first places the switch 25 in position to engage the contact 24. The ground radio stations to be used in obtaining the fix are chosen and the true north azimuth between them is determined from a map. The knob 68 of the indicator 18 is turned until this azimuth bearing is read on the index on the front of the instrument. The left radio compass loop 10 is then tuned in on the westerly of the two radio stations and the right radio compass is tuned in on the easterly station. The light beams of the indicator 18 are then switched on. For the purpose of providing a control over the brilliance of the two light beams, a rheostat may be placed in the circuit of the two light bulbs 52 if so desired. If the operator then has a transparent map of the area drawn to the proper scale. It will be placed over the face of the indicator. The indicator illustrated in Fig. 4 shows a transparent map of the San Francisco bay area and it is obvious that such maps may be prepared for all desired locations.

My device may be utilized for the setting up of multiple approach patterns as well as being utilized for instrument landings. An example of how my device may be used in conjunction with a radio altimeter to form an instrument landing system is shown in Fig. 5. The example given is a field which has a known directional homing station approximately three miles north of an 8000 foot runway. A second low frequency transmitter placed about 800 feet from the southeast end of the runway on its center line serves as the easterly station of the radio fix. The true azimuth between the two stations is 170° and the distance 2.93 miles. A cover plate for the indicator face may be prepared showing the terrain information and landing pattern thereon. Or, the runway and landing pattern may be sketched on the transparent cover plate of the indicator 18 with a wax pencil by the operator. On the initial and final approaches the intersection of the two light beams can be made to follow the dotted line, bringing the aircraft fix over the homing station, then over the runway marker station, indicating at all times the exact position of the aircraft with respect to the runway.

Referring again to the indicator 18, the signal supplied to the rotors 17 and 20 of the left and right differential Selsyns respectively by their loop transmitter Selsyns, act to turn the differential Selsyn rotors to a position corresponding with the back of the loop, or the reciprocal of the reading on the radio compass indicator. The reciprocal loop bearing is utilized in order that the light beams give station-to-aircraft bearings. Signals supplied to the differential Selsyn stators by the flux gate transmitting Selsyn 23 act to turn the differential Selsyn rotors through the angle and in the direction that the aircraft heading differs from true north. The sum of the two forces acting upon the differential Selsyn rotors allows the light beams to indicate the true azimuth from the radio station to aircraft, regardless of aircraft heading.

It is thus seen that my invention provides a compact simple device which enables the pilot of an aircraft or vehicle to determine at a glance the fix of the vehicle as well as continuous bearings from each of the ground radio stations to the aircraft. My device may also be used as two radio compass indicators in the ordinary manner of operation.

Changes may be made in the above construction and many widely different embodiments of this invention can be made without parting from the scope thereof as set forth in the claims appended hereto. It is intended that all matter described or shown shall be interpreted as illustrative and not in a limited sense.

Having described my invention, I claim:

1. In a navigational system having a radio compass and a north seeking compass, a self synchronous transmitter arranged to duplicate the angular position of the radio compass antenna, a self-synchronous transmitter arranged to duplicate the angular position of said north seeking compass, an indicator device having a differential self-synchronous receiver, means for connecting said radio compass self synchronous transmitter and said north seeking compass self synchronous transmitter to said differential self synchronous receiver whereby said differential self synchronous receiver indicates the angular position of the radio compass loop as modified by the north seeking compass reading.

2. In a navigational indicating system having a pair of radio compasses and a north seeking compass, a self synchronous transmitter connected to each of said radio compasses and said north seeking compass, an indicator instrument including a pair of differential self synchronous receivers, means for connecting the stator of one of said radio compass self synchronous transmitters to the rotor of one of said differential self synchronous receivers, means for connecting the stator of the other of said radio compass self synchronous transmitters to the rotor of said other differential self synchronous receivers, and means for connecting the stator of said north seeking compass self synchronous transmitter to the stator of each of said differential self synchronous receivers.

3. In a navigational system of the class described having a pair of radio compasses and north seeking compass, an indicator device having two differential self synchronous receivers, a self synchronous transmitter at each of said radio compasses and said north seeking compass, means for connecting said self-synchronous transmitters to said differential self synchronous receivers whereby the angular position of each of said radio compass antennas is duplicated by each of said differential self synchronous receivers, the azimuth indications of said differential self synchronous receivers being modified by the output of said compass self synchronous transmitter.

4. In a navigational indicating system having a pair of radio compasses and a north seeking compass, a self synchronous transmitter connected to each of said radio compasses to duplicate the angular position of each radio compass loop, a self synchronous transmitter connected to said north seeking compass to duplicate the angular position of said compass indicator, an indicator having a pair of differential self-synchronous receivers, means connecting the stator of one of said radio compass self synchronous transmitters to the rotor of one of said differential self synchronous receivers, means for connecting the stator of said north seeking compass self synchronous transmitter to the stator of each of said differential self synchronous receivers whereby the rotor of each of said differential self synchronous receivers duplicates the angular position of said radio compass loop modified by the azimuth position of said north seeking compass.

5. An indicating device of the class described, a rotatable support, a pair of differential self synchronous receivers mounted upon said rotatable support, means mounted upon each of said receivers for forming a narrow beam of light, said light beams indicating the angular position of said Selsyn rotors, a translucent member upon which said light beams impinge, a translucent rose card for each of said receivers, means to rotate said support, and means to maintain each of said rose cards in their original angular position regardless of the angular position of said rotatable support.

6. An indicating device of the class described, a rotatable support, a pair of differential self synchronous receivers mounted upon said rotatable support, means mounted upon each of said receivers for forming a narrow beam of light, said light beams indicating the angular position of said receiver rotors, a translucent rose card for each of said receivers, gear means to rotate said support and to maintain each of said rose cards in their original angular position regardless of the angular position of said rotatable support.

7. In a device of the class described, an assembly having two differential self synchronous receivers mounted thereon, a light source mounted upon each of said receivers, means forming a narrow beam of light from each of said light sources, a translucent member upon which said light beams impinge, a translucent rose card for each receiver mounted upon said translucent member, means for rotating said assembly, and means for maintaining each of said rose cards in the same angular position regardless of the angular position of said assembly.

8. In a device of the class described, an assembly having two differential self synchronous receivers thereon, a center self synchronous receiver mounted in fixed relationship between said two differential receivers, a light source mounted upon each of said differential Selsyns, means for forming a narrow beam of light from each of said light sources, a translucent member upon which said light beams impinge, an indicator needle for said center self synchronous receiver, a rose card for each of said differential receivers, said rose cards being mounted upon said translucent member, means for rotating said assembly, and means for maintaining the original angular position of each of said rose cards regardless of the angular position of said assembly.

9. An indicating device comprising a frame, a rotatable support within said frame, a pair of differential self synchronous receivers mounted upon said rotatable support, means mounted upon the shaft of each of said self synchronous receivers for forming a narrow beam of light to indicate the angular position of the synchronous receiver shaft, a translucent plate on said frame upon which said narrow beams of light are displayed, a pair of compass rose cards rotatably mounted upon said translucent plate, the center of each of said compass cards being in line with the shaft of its corresponding self synchronous receiver, means for rotating said support through a limited arc, means for maintaining the original position of said compass cards as said support is rotated.

10. In a navigational device for use on a vehicle having a radio compass and a north seeking compass, a compact unitary indicating instrument for continuously displaying the true azimuth bearing of the vehicle with respect to each of at least two radio transmitting stations and for displaying a continuous fix of the vehicle, said instrument comprising at least two indicators at a fixed distance from each other mounted on a rotatable support, means for rotating said support, the angular position of said support representing the true azimuth position between said two radio transmitting stations, each of said indicating means including a differential self synchronous receiver to combine the radio compass and north seeking compass indications to display the true azimuth angle between the vehicle and one of said radio transmitting stations, each of said indicators including a light means and compass card to continuously display the fix of the vehicle relative to said two radio transmitting stations.

11. In a navigational device of the type for use on a vehicle having a radio compass and a north-seeking compass; a unitary indicating instrument for displaying the true azimuth bearing of the vehicle with respect to each of at least two radio transmitting stations and for displaying a continuous fix of the vehicle, said instrument comprising at least two indicators having a fixed distance between their centers, adjustable mounting means for said indicators, means for adjusting said mounting means so that a straight line between the centers of said two indicators represents the true azimuth line between said two radio transmitting stations, each of said indicators including means to combine the radio compass indications and the north-seeking compass indications to continuously display the true azimuth angle between the vehicle and one of the radio transmitting stations, each of said indicators having means to continuously display the fix of the vehicle with respect to said two radio transmitters.

LLEWELLYN G. DUGGAR.

REFERENCES CITED

The following references are of record in the file of this patent:

UNITED STATES PATENTS

| Number | Name | Date |
|---|---|---|
| 1,612,120 | Hildebrand | Dec. 28, 1926 |
| 1,965,098 | Eaton | July 3, 1934 |
| 2,080,511 | Sjostrand | May 18, 1937 |
| 2,127,415 | Marique | Aug. 16, 1938 |
| 2,307,029 | Elm | Jan. 5, 1943 |
| 2,361,956 | Moseley | Nov. 7, 1944 |